United States Patent
Harada et al.

(10) Patent No.: US 9,263,198 B2
(45) Date of Patent: Feb. 16, 2016

(54) ELECTRICAL STORAGE DEVICE

(71) Applicant: MURATA MANUFACTURING CO., LTD., Nagaokakyo-Shi, Kyoto-fu (JP)

(72) Inventors: Hiroyuki Harada, Nagaokakyo (JP); Masaharu Itaya, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 214 days.

(21) Appl. No.: 14/028,657

(22) Filed: Sep. 17, 2013

(65) Prior Publication Data

US 2014/0092527 A1    Apr. 3, 2014

(30) Foreign Application Priority Data

Sep. 29, 2012   (JP) ................................ 2012-218907

(51) Int. Cl.
| | |
|---|---|
| *H01G 9/00* | (2006.01) |
| *H01G 11/80* | (2013.01) |
| *B82Y 99/00* | (2011.01) |
| *B82Y 30/00* | (2011.01) |

(52) U.S. Cl.
CPC ................ *H01G 11/80* (2013.01); *B82Y 30/00* (2013.01); *B82Y 99/00* (2013.01); *Y02E 60/13* (2013.01); *Y10S 977/948* (2013.01)

(58) Field of Classification Search
CPC ............ H01G 9/28; H01G 9/08; H01G 9/008
USPC ......... 361/502, 503–504, 509–512, 517–518, 361/535–537, 540, 541
See application file for complete search history.

(56) References Cited

U.S. PATENT DOCUMENTS

| | | | |
|---|---|---|---|
| 8,253,144 B2 | 8/2012 | Yamazaki et al. | |
| 2009/0061309 A1* | 3/2009 | Ushio et al. | .................. 429/185 |
| 2011/0128673 A1 | 6/2011 | Lee et al. | |
| 2011/0188169 A1* | 8/2011 | Park et al. | .................. 361/301.4 |
| 2012/0297594 A1 | 11/2012 | Lee et al. | |

FOREIGN PATENT DOCUMENTS

| | | |
|---|---|---|
| JP | H06-48168 U | 6/1994 |
| JP | 2002-198087 A | 7/2002 |
| JP | 2006-222247 A | 8/2006 |
| JP | 2006-310834 A | 11/2006 |
| JP | 2011-014864 A | 1/2011 |
| JP | 2011-100988 A | 5/2011 |
| JP | 2011-119639 A | 6/2011 |
| JP | 2011-210900 A | 10/2011 |
| JP | 2012-069508 A | 4/2012 |

* cited by examiner

*Primary Examiner* — Nguyen T Ha
(74) *Attorney, Agent, or Firm* — Arent Fox LLP

(57) ABSTRACT

An electric double-layer capacitor having a capacitor element, a package defining a closed space accommodating the capacitor element, and electrolytic solution loaded in the closed space. The package includes a body and a lid, and the body has a metallic portion and a resin portion. The metallic portion includes two lead-out terminals electrically coupled to the capacitor element, and these two lead-out terminals are electrically isolated from each other by the resin portion. The resin portion includes two projections extending into the closed space, which make the closed space narrower and reduce the amount of loading of the electrolytic solution.

16 Claims, 5 Drawing Sheets

ELECTRICAL STORAGE DEVICE

CROSS REFERENCE TO RELATED APPLICATIONS

The present application claims priority to Japanese Patent Application No. 2012-218907, filed Sep. 29, 2012, the entire contents of which are incorporated herein by reference.

FIELD OF THE INVENTION

The present invention relates to electrical storage devices, such as electric double-layer capacitors, lithium-ion batteries, and lithium-ion capacitors, and in particular to the structure of a package defining a closed space accommodating an electrical storage element and electrolytic solution.

BACKGROUND OF THE INVENTION

One technology of interest to the present invention is that found in Japanese Unexamined Patent Application Publication No. 2011-100998. This publication discloses, particularly in FIGS. 1 and 3, a package for an electric double-layer capacitor having a tray-shaped body and a lid.

Electric double-layer capacitors or similar electrical storage devices, which have a package accommodating positive and negative electrodes and electrolytic solution, should be improved to consume less of the electrolytic solution since the electrolytic solution is expensive.

The electrolytic solution must fill the space between the positive and negative electrodes so that ions can move between the pair of electrodes. This means that the electrical storage device can operate with no electrolytic solution in any part other than the space between the positive and negative electrodes; allowing the expensive electrolytic solution to exist is fairly meaningless unless between the two electrodes.

For this reason, the use of electrolytic solution in electrical storage devices should be minimized. However, packages designed as in the publication mentioned above are not effective in reducing the amount of use of the electrolytic solution because the electrolytic solution spreads and gets into some internal spaces which should be empty.

SUMMARY OF THE INVENTION

Accordingly, it is an object of the present invention to provide an electrical storage device, or more specifically the structure of a package for electrical storage devices, which can operate with a reduced amount of electrolytic solution without losing the functionality thereof.

A preferred embodiment of the present invention is directed to an electrical storage device having an electrical storage element, a package, and electrolytic solution. The electrical storage element has a first main surface and a second main surface facing each other and a plurality of element terminals. The package defines a closed space accommodating the electrical storage element. The electrolytic solution is loaded in the closed space.

The package has a body and a lid. The body has a bottom wall facing the first main surface of the electrical storage element, and the lid has a main wall facing the second main surface of the electrical storage element. The body has a metallic portion and a resin portion. The metallic portion includes a plurality of lead-out terminals, and the lead-out terminals are electrically coupled to the plurality of element terminals and extend through the body in the direction of the thickness of the body. The resin portion includes a projection extending into the closed space, and the projection makes the closed space narrower and reduces the amount of loading of the electrolytic solution.

The projection makes the closed space narrower, thereby reducing the amount of the electrolytic solution loaded in the closed space.

According to another preferred embodiment, the resin portion includes a section electrically insulating the plurality of lead-out terminals from each other. This configuration allows the section electrically insulating the lead-out terminals from each other to be formed integrally with the resin portion, i.e., the portion where the aforementioned projection is formed. As a result, when the resin portion is produced by means such as injection molding, this insulating section and the projection can be formed simultaneously.

It should also be noted that in this preferred embodiment the projection is formed using the resin portion, i.e., an essential section of the body of the package and electrical insulator for the lead-out terminals. This embodiment therefore requires no special components for the formation of the projection and can be implemented without substantial increase in cost.

In an electrical storage device according to another preferred embodiment of the present invention, the projection reaches the main wall of the lid. This configuration allows the lid to be supported by the projection, thereby ensuring that the lid is deformed by external stress to a reduced extent even when the lid is relatively thin.

According to a more preferred embodiment, the lid has a side wall along the edge portion of the main wall, and the projection reaches both the main wall and the side wall. This configuration allows the projection to improve the aforementioned resistance of the electrical storage device to external stress more effectively and to guide the position of the lid with respect to the body more reliably than in the above configuration.

According to another preferred embodiment of the present invention, the resin portion includes two projections, the electrical storage element is sandwiched between the two projections with one of the projections by one end portion of the storage element and the other by the other end portion, two of the element terminals are located at the end portions of the electrical storage element, and two of the lead-out terminals are located within the area defined between the two projections. This configuration ensures that the position of the electrical storage element in the package can be guided by the two projections.

According to another preferred embodiment of the present invention, the bottom wall of the body includes a section where the metallic portion and the resin portion are layered. This configuration improves the moisture barrier properties of the entire package because the metallic portion is highly impermeable to water. Thus, it is more preferred that the section where the metallic portion and the resin portion are layered is at least about half or greater by area of the bottom wall of the body.

This improvement in moisture barrier properties brought about by the section where the metallic portion and the resin portion in the bottom wall of the body are layered is of great significance to embodiments of the present invention. Electrical storage devices according to embodiments of the present invention can operate with a reduced amount of electrolytic solution thanks to the presence of the projection(s). A loss of the electrolytic solution from this reduced amount due to the evaporation of the solution or other causes immediately affects the performance and other attributes of the device. Consequently, this type of configuration, which can prevent the electrolytic solution from the loss due to evaporation or other causes, has profound significance. This also applies to the improvement of the moisture barrier properties using polymers described below.

According to another preferred embodiment of the present invention, the resin portion is made of polyether ether ketone, polyphenylene sulfide, or a liquid-crystalline polymer. Polyether ether ketone, polyphenylene sulfide, and liquid-crystalline polymers give high moisture barrier properties to the package because these polymers can tightly seal and firmly adhere to the metallic portion and are highly resistant to heat and chemicals, in particular, electrolytic solutions, under normal conditions of use.

According to another preferred embodiment of the present invention, the lead-out terminals have fine depressions with a diameter of about 20 nm to about 60 nm on the surface thereof. Such depressions can be produced by, for example, surface treatment of the lead-out terminals. In this configuration the anchor effect produced by the fine depressions enhances the strength of the bonding between the lead-out terminals and the resin portion.

The present invention, in various preferred embodiments, provides electrical storage devices having a package defining a closed space in which electrolytic solution is loaded. The body of the package has a projection extending into the closed space, and this projection makes the closed space narrower and reduces the amount of the electrolytic solution loaded in the closed space without affecting the functionality of the device. The reduced use of expensive electrolytic solutions contributes to cutting down on the cost of producing electrical storage devices.

In general, electrical storage devices are mounted on circuit boards by reflow soldering or used in practical settings with the body of the package down and the lid up. With the package in this position, the electrolytic solution leaking out of the package by gravity must flow through the body of the package. The projection used in preferred embodiments of the present invention also contributes to preventing this type of leakage of the electrolytic solution because the projection extends from the resin portion of the body of the package and reduces the area of the contact between the bottom wall of the body and the electrolytic solution.

Furthermore, the projection extends from the body of the package, which is usually the lower part of the package. Thus, the projection can also be advantageously used to hold the electrical storage element in place.

Other features, elements, characteristics and advantages of the present invention will become more apparent from the following detailed description of preferred embodiments of the present invention with reference to the attached drawings.

DETAILED DESCRIPTION OF THE PREFERRED EMBODIMENTS

The following describes an electric double-layer capacitor 1, an electrical storage device according to Embodiment 1 of the present invention, with reference to FIGS. 1 to 7. Note that in FIGS. 1, 2, 4, and 7, and in FIGS. 9 and 10 mentioned later herein, the thickness of each element is larger than in reality for easier understanding of the illustrated structure.

Figure 1:
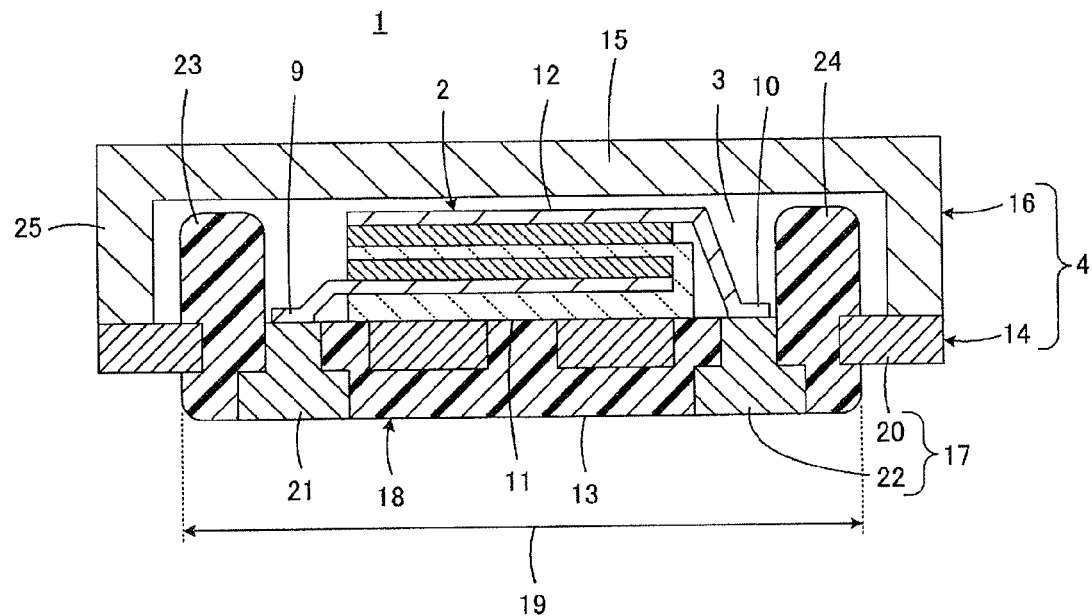
FIG. 1 is a cross-sectional view of an electric double-layer capacitor, an electrical storage device according to Embodiment 1 of the present invention.

As illustrated in FIG. 1, the electric double-layer capacitor 1 has a capacitor element 2 (the electrical storage element), a package 4 defining a closed space 3 accommodating the capacitor element 2, and electrolytic solution (not illustrated) loaded in the closed space 3.

Figure 2:
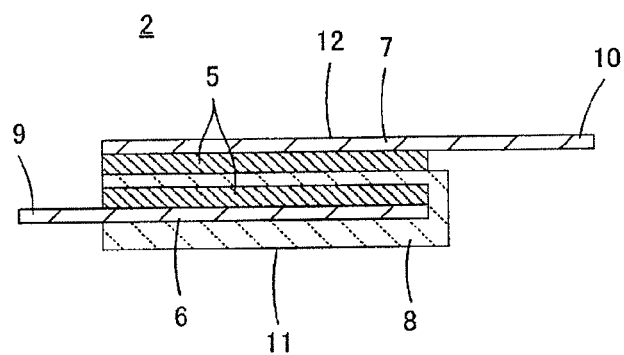
FIG. 2 is an isolated cross-sectional view of the capacitor element, the electrical storage element of the electric double-layer capacitor illustrated in FIG. 1.

The capacitor element 2 is, as illustrated in FIG. 2, composed of active material 5, a first collector 6 and a second collector 7 facing each other with the active material 5 therebetween, and a separator 8 separating the active material 5 into the first collector 6 side and the second collector 7 side. The end portion of the first collector 6 and that of the second collector 7 are located at the end portions of the capacitor element 2, serving as a first element terminal 9 and a second element terminal 10, respectively.

An example of an ingredient of the active material 5 is activated charcoal. The first collector 6 and the second collector 7 can be, for example, pieces of aluminum foil, and one of the two collectors is used as the positive electrode and the other as the negative electrode. The separator 8 is made of a porous material that allows the electrolytic solution to pass through. Examples of porous materials that can be used include polymers such as polypropylene and polyethylene and kinds of paper. The electrolytic solution loaded in the closed space 3 penetrates into the active material 5 and the separator 8. The electrolytic solution can be an aqueous one or an organic one or an ionic liquid.

The capacitor element 2 has first and second main surfaces 11 and 12 facing each other. As illustrated in FIG. 1, the package 4 has a body 14 and a lid 16. The body 14 has a bottom wall 13 facing the first main surface 11 of the capacitor element 2, and the lid 16 has a main wall 15 facing the second main surface 12 of the capacitor element 2.

Figure 3:
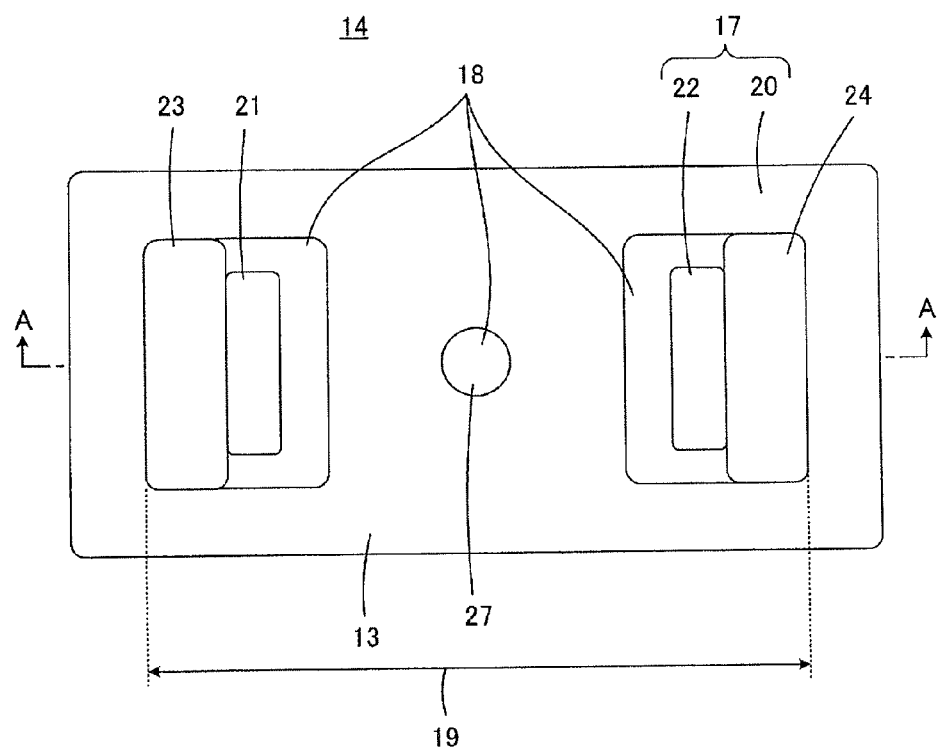
FIG. 3 is an isolated plan view of the body of the package used in the electric double-layer capacitor illustrated in FIG. 1.
Figure 4:
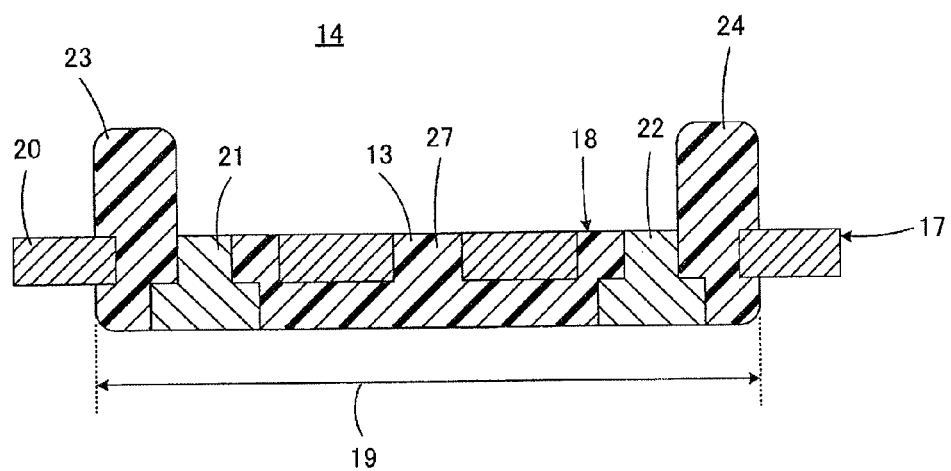
FIG. 4 is a cross-sectional view of the body 14 taken along line IV-IV in FIG. 3.
Figure 5:
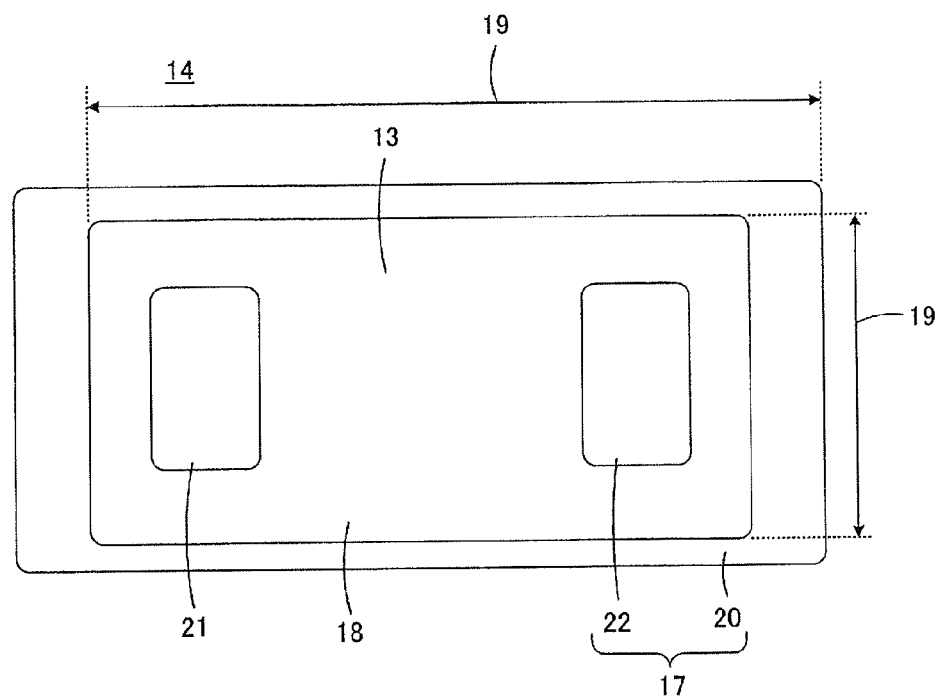
FIG. 5 is a bottom view of the body illustrated in FIG. 3.

The body 14 alone is illustrated in FIGS. 3 to 5. The body 14 has a metallic portion 17 and a resin portion 18.

The metallic portion 17 includes a metal plate 20 and first and second lead-out terminals 21 and 22. The metal plate 20 extends around the bottom wall 13 in the body 14 and, in a section 19 in the middle portion, overlaps with the resin portion 18 to make layers (hereinafter referred to as the layered section). The first and second lead-out terminals 21 and 22 are electrically coupled to the first and second element terminals 9 and 10, respectively, and extend through the body 14 in the direction of thickness.

Owing to the high moisture barrier properties of the metal plate 20, the layered section 19 makes the entire package 4 less permeable to water. Thus, it is preferred that the layered section 19 is at least about half or greater by area of the bottom wall 13 of the body 14.

The resin portion 18 electrically insulates the first and second lead-out terminals 21 and 22 from each other and also provides electrical insulation between the first and second lead-out terminals 21 and 22 and the metal plate 20.

Although in the illustrated embodiment the metal plate 20 in the layered section 19 is exposed on the surface of the body 14, the metal plate 20 may be embedded in the resin portion 18 of the body 14. It is also possible that two or more metal plates 20 are stacked in the layered section 19 with the resin portion 18 therebetween.

What characterizes this embodiment of the present invention is two projections 23 and 24 formed in the resin portion 18. The projections 23 and 24 extend into the closed space 3, making the closed space 3 narrower and reducing the amount of loading of the electrolytic solution. As illustrated in FIG. 1, the capacitor element 2 is sandwiched between these two projections 23 and 24 with one of the two projections by one end portion of the capacitor element 2 and the other by the other end portion. The aforementioned two lead-out terminals 21 and 22 are located within the area defined between the two projections 23 and 24. In this way, the two projections 23 and 24 guide the position of the capacitor element 2 in the package 4.

The components of the metallic portion 17, i.e., the metal plate and the lead-out terminals 21 and 22, can be made of aluminum or an aluminum alloy, for example.

Examples of materials that can be used to make the resin portion 18 include polyether ether ketone (PEEK), polyphenylene sulfide (PPS), liquid-crystalline polymers (LCPs), polypropylene, polyethylene, polyethylene terephthalate, polybutylene terephthalate (PBT), polyvinyl chloride, fluoropolymers, and acrylic resins.

Preferably, the resin portion 18 is made of PEEK, PPS, or an LCP. PEEK, PPS, and LCPs give high moisture barrier properties to the package 4 because these polymers can tightly seal and firmly adhere to the metallic portion 17 and are highly resistant to heat and chemicals, in particular, electrolytic solutions, under normal conditions of use.

Examples of suitable LCPs include fully aromatic polyamides, fully aromatic polyesters, polyesteramides, polyamide-imides, polyester carbonates, and polyazomethines.

Figure 6:
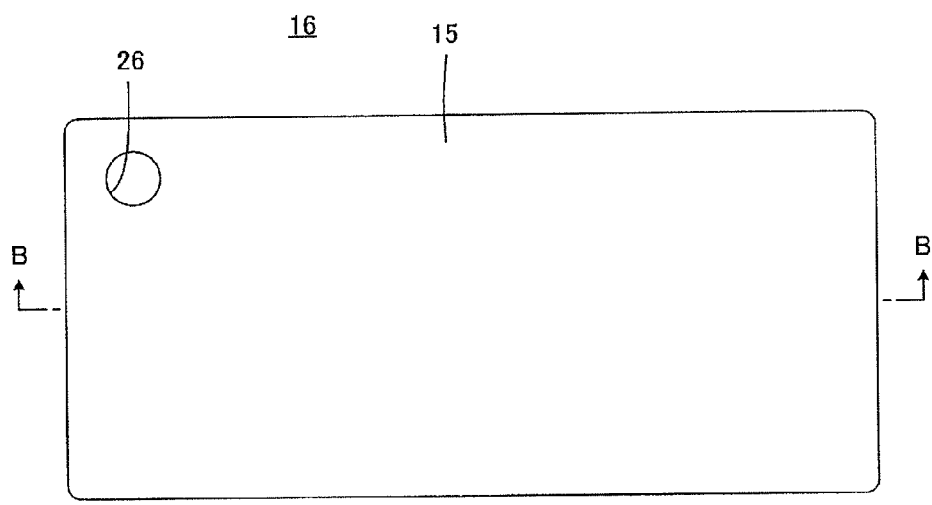
FIG. 6 is an isolated plan view of the lid of the package used in the electric double-layer capacitor illustrated in FIG. 1.
Figure 7:
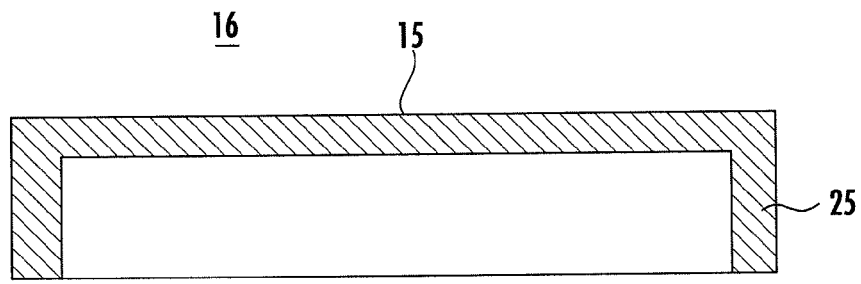
FIG. 7 is a cross-sectional view of the lid taken along line VII-VII in FIG. 6.

The lid 16 of the package 4 alone is illustrated in FIGS. 6 and 7.

Besides the aforementioned main wall 15, the lid 16 has a side wall 25 along the edge portion of the main wall 15. As illustrated in FIG. 6, the main wall 15 has a liquid inlet port 26 near one of the corners thereof. The electrolytic solution is injected into the package 4 through this liquid inlet port 26.

A typical way to produce the electric double-layer capacitor 1 having such a configuration is as follows.

First, the capacitor element 2 and the body 14 and the lid 16 of the package 4 are prepared.

The production of the body 14 begins with the preparation of the components of the metallic portion 17, i.e., the metal plate 20 and the two lead-out terminals 21 and 22. When the lead-out terminals 21 and 22 are made of aluminum or an aluminum alloy, it is preferred to subject the lead-out terminals 21 and 22 to a surface treatment such as the one described below.

First, an aqueous solution containing at least one selected from ammonia ($NH_3$), hydrazine ($N_2H_4$), and a water-soluble amine is prepared. Examples of water-soluble amines that can be used include lower amines, and examples of particularly suitable ones include methylamine ($CH_3NH_2$), dimethylamine (($CH_3)_2NH$), trimethylamine (($CH_3)_3N$), ethylamine ($C_2H_5NH_2$), diethyl amine (($C_2H_5)_2NH$), triethylamine (($C_2H_5)_3N$), ethylenediamine ($H_2NCH_2CH_2NH_2$), ethanolamine (monoethanolamine) ($HCCH_2CH_2NH_2$), allylamine ($CH_2CH_2CH_2NH_2$), and diethanolamine (($HOCH_2CH_2)_2NH$).

The concentration of the aqueous solution is in the range of about 2% to about 30%, and the lead-out terminals 21 and 22 are immersed in this aqueous solution at a temperature from about room temperature to about 60° C. for a few minutes to about 30 minutes. For example, when aqueous ammonia is used, it is preferred that the concentration is in the range of about 10% to about 30%, the temperature is about room temperature, and the duration of immersion is in the range of about 15 minutes to about 120 minutes.

The lead-out terminals 21 and 22 are then taken out of the aqueous solution, washed in water, and dried.

Such a treatment produces fine depressions with a diameter of about 20 nm to about 60 nm on the surface of the lead-out terminals 21 and 22.

Then, the lead-out terminals 21 and 22 and the metal plate 20 are inserted into a die for injection molding (not illustrated), and the resin portion 18 is produced by injection molding using this dye. The substantially cylindrical section 27 of the resin portion 18, seen in FIGS. 3 and 4, corresponds to the gate of the die, i.e., the inlet port through which the raw material polymer is injected into the die cavity. Although not illustrated in the drawings, the shape of the die cavity can be seen from the outer shape of the resin portion 18 illustrated in FIGS. 3 to 5.

This injection molding process forms the projections 23 and 24 in the resin portion 18.

Then, the capacitor element 2 is placed on the body 14 with the first main surface 11 of the capacitor element 2 facing the bottom wall 13 of the body 14.

The first and second element terminals 9 and 10 of the capacitor element 2 are then coupled to the first and second lead-out terminals 21 and 22, respectively, formed in the body 14, by means such as ultrasonic welding.

Subsequently, the lid 16 is put on the body 14 with the main wall 15 of the lid 16 facing the second main surface 12 of the capacitor element 2. The edge portion of the side wall 25 of the lid 16 and the peripheral portion of the body 14, i.e., the outer portion of the metal plate 20, are joined together by means such as laser welding.

The electrolytic solution is then injected through the liquid inlet port 26 formed through the lid 16, and the package 4 is loaded with the injected electrolytic solution.

After vacuum impregnation, the liquid inlet port 26 is closed and, as a result, the package 4 is sealed. For example, the package 4 can be sealed by inserting a substantially cylindrical small stopper (not illustrated) into the liquid inlet port 26 and joining the stopper and the lid 16 together by laser welding.

In this way, the electric double-layer capacitor 1 is completed.

The formation of the aforementioned layered section 19 is not essential for all embodiments of the present invention. However, an experiment was conducted to verify the effect of this layered section 19. The following describes the method and the results of the experiment.

Electric double-layer capacitors were fabricated in the following way.

A slurry as the intermediate for the active material was prepared by mixing activated charcoal, carboxymethyl cellulose (a binder), and carbon black (conductive material). A sheet from which the electrodes would be produced, or an electrode sheet, was then produced by applying the obtained slurry to a sheet of aluminum foil using a slit die coater and drying the formed coating. The obtained, electrode sheet was slit and cut into positive and negative electrodes each composed of the active material and a collector. The negative electrode was covered with a polyimide-based separator so that the negative electrode would be protected from direct contact with the positive electrode which could cause a short circuit. The positive electrode and the negative electrode were then stacked on each other. In this way, an electrode stack (two layers) was obtained for use as the capacitor element.

The obtained electrode stack was placed on the body of the package. Each of the positive and negative electrodes had an uncoated portion, or some length of bare aluminum foil, and the first and second lead-out electrodes formed in the body were coupled to the positive and negative electrodes, respectively, at the uncoated portion by ultrasonic welding.

The lid of the package was then put on the body, and the lid and the body were joined together along the peripheral portion of the body by laser welding.

The electrolytic solution was then injected through the liquid inlet port formed through the lid. After vacuum impregnation, a small stopper was inserted into the liquid inlet port, and the stopper and the lid were joined together by laser welding to tightly seal the package. In this way, electric double-layer capacitors were fabricated for use as samples for testing.

The fabricated samples consisted of electric double-layer capacitors according to Examples 1, 2, and 3 and Comparative Examples 1 and 2. The following details these Examples and Comparative Examples with reference to FIG. 1.

The electric double-layer capacitors of Examples 1 and 3 were similar in structure to the electric double-layer capacitor 1 illustrated in FIG. 1 except that the layered section 19 in the bottom wall 13 of the body 14 of the package 4 was not formed. The structure of the electric double-layer capacitor according to Example 2 was similar to that of the electric double-layer capacitor 1 illustrated in FIG. 1. The electric double-layer capacitors of Comparative Examples 1 and 2 had a structure similar to that of the electric double-layer capacitor 1 illustrated in FIG. 1 except that the layered section 19 in the bottom wall 13 of the body 14 of the package 4 and the projections 23 and 24 were not formed.

In Examples 1 and 2 and Comparative Example 1, the electrolytic solution was a 1.0 mol/L solution of triethylmethylammonium tetrafluoroborate ($TEMABF_4$) in acetonitrile (AN). The capacity of the package to store the electrolytic solution was 100 µL in Examples 1 and 2 and 110 µL in Comparative Example 1.

Prepared in this way, the electric double-layer capacitors according to Examples 1 and 2 and Comparative Example 1 had dimensions of 20.0 mm by 10.0 mm by 1.5 mm, an electrostatic capacity (CAP) of 140 mF, and an equivalent series resistance (ESR) of 200 mΩ.

In Example 3 and Comparative Example 2, the electrolytic solution was 1-ethyl-3-methylimidazolium bis(trifluoromethanesulfonyl)imide (EMITFSI). The capacity of the package to store the electrolytic solution was 100 µL in Example 3 and 110 µL in Comparative Example 2.

Prepared in this way, the electric double-layer capacitors according to Example 3 and Comparative Example 2 had dimensions of 20.0 mm by 10.0 mm by 1.5 mm, a CAP of 140 mF, and an ESR of 1400 mΩ.

(1) Evaporation Test

The electric double-layer capacitors of Examples 1 and 2 and Comparative Example 1 were evaluated for the evaporation of the electrolytic solution.

For each of Examples 1 and 2 and Comparative Example 1, 94.2 mg of the electrolytic solution was injected, and the electric double-layer capacitor as the sample for testing was put into a thermostat maintained at 70° C. The weight of the sample was measured and the change in the weight of the electrolytic solution was recorded at specified time points while the sample was in the thermostat.

Figure 8:
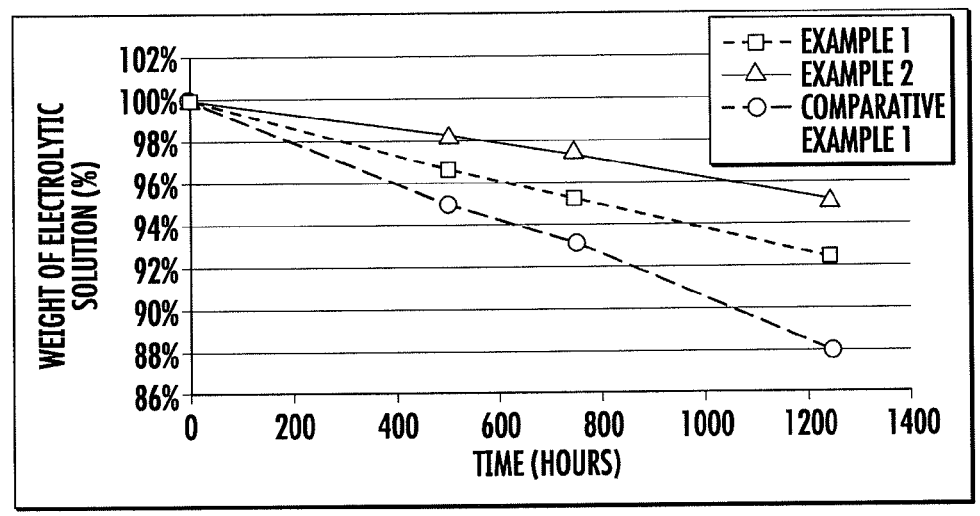
FIG. 8 shows the results of an evaporation test conducted using the electric double-layer capacitors of Examples 1 and 2 and Comparative Example 1 produced in the Experiment. Each of the electric double-layer capacitors for use as samples for testing was left in a thermostat while the change in the weight of the electrolytic solution was recorded at specified time points.

The Table 1 and FIG. 8 show the results.

TABLE 1

|  | 0 hours | 500 hours | 750 hours | 1250 hours |
| --- | --- | --- | --- | --- |
| Example 1 | 100% | 96.5% | 95.0% | 92.0% |
| Example 2 | 100% | 98.2% | 97.3% | 94.9% |
| Comparative Example 1 | 100% | 94.8% | 92.9% | 87.9% |

As can be seen from the Table 1 and FIG. 8, in Comparative Example 1, the ingredients of the electrolytic solution, in particular, AN, evaporated through the resin portion of the package, and the weight of the electrolytic solution at 1250 hours was only 87.9% of the baseline weight.

In Example 1, however, a smaller amount of AN in the electrolytic solution evaporated through the resin portion of the package, and the weight of the electrolytic solution at 1250 hours was 92.0% of the baseline weight; the retention of the electrolytic solution was better in Example 1 than in Comparative Example 1. These results confirmed that the projections can reduce the area of the contact between the bottom wall of the body and also contribute to preventing the leakage of the electrolytic solution.

The capacitor of Example 2 had the layered section in addition to the projections. In this Example, thus, an even smaller amount of AN in the electrolytic solution evaporated through the resin portion, and the retention of the electrolytic solution was much better; the weight of the electrolytic solution at 1250 hours was 94.9% of the baseline weight.

(2) Heat Resistance Test

The electric double-layer capacitors of Example 3 and Comparative Example 2 were evaluated for the resistance to heat.

For each of Example 3 and Comparative Example 2, 167.2 mg of the electrolytic solution was injected, and the electric double-layer capacitor as the sample for testing was heated in a temperature range of 150° C. to 160° C. for 79 seconds. After this preheating process, the temperature was increased to a peak of 260° C. at a rate of 3° C./sec, and this peak temperature was maintained for 7 seconds. The capacitor was then allowed to cool, and the outside of the package was visually inspected for signs of leakage.

The capacitor of Comparative Example 2 was found to have leaked, while that of Example 3 was found intact, demonstrating its improved resistance to heat.

Figure 9:
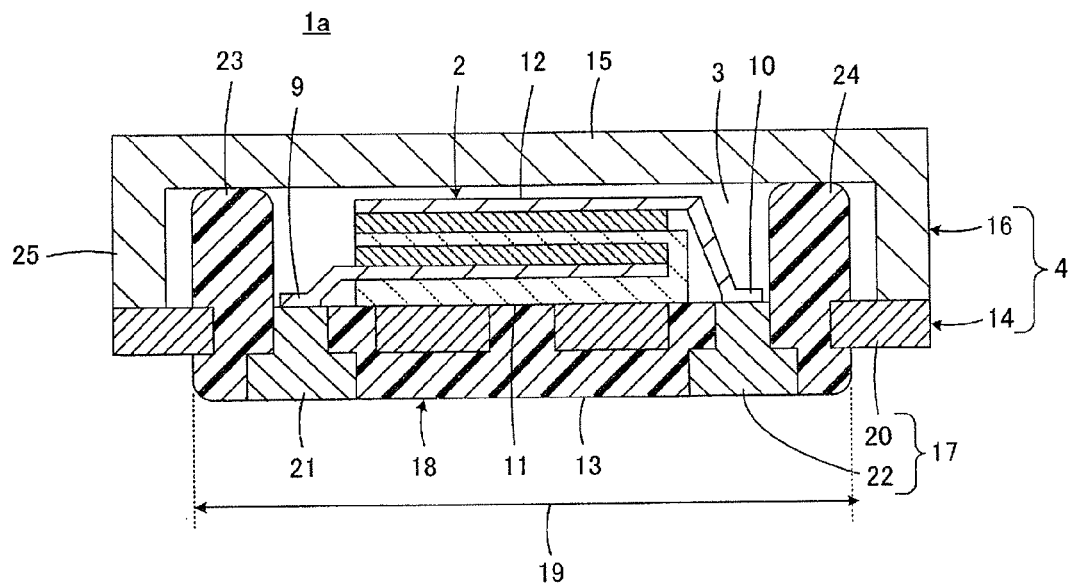
FIG. 9 is a cross-sectional view of an electric double-layer capacitor, an electrical storage device according to Embodiment 2 of the present invention.

The following describes an electric double-layer capacitor 1*a*, an electrical storage device according to Embodiment 2 of the present invention, with reference to FIG. 9. In FIG. 9, like reference numerals represent like elements in FIG. 1. The details of the elements already described herein are omitted in the following.

In the electric double-layer capacitor 1a illustrated in FIG. 9, the projections 23 and 24 reach the main wall 15 of the lid 16. This configuration allows the lid 16 to be supported by the projections 23 and 24, thereby ensuring that the lid 16 is deformed by external stress to a reduced extent even when the lid 16 is relatively thin.

Figure 10:
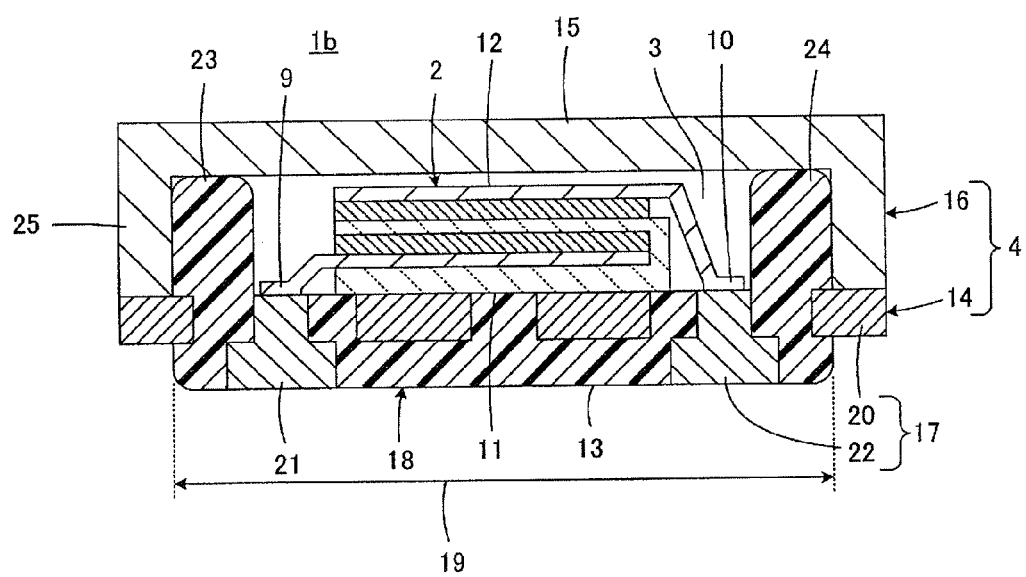
FIG. 10 is a cross-sectional view of an electric double-layer capacitor, an electrical storage device according to Embodiment 3 of the present invention.

The following describes an electric double-layer capacitor 1b, an electrical storage device according to Embodiment 3 of the present invention, with reference to FIG. 10. In FIG. 10, like reference numerals represent like elements in FIG. 1. The details of the elements already described herein are omitted in the following.

In the electric double-layer capacitor 1b illustrated in FIG. 10, the projections 23 and 24 reach both the main wall 15 and the side wall 25 of the lid 16. Configured in this way, the projections 23 and 24 can improve the resistance to external stress more effectively and guide the position of the lid 16 with respect to the body 14 more reliably than in the electric double-layer capacitor 1a illustrated in FIG. 9.

Note that although in the above description electric double-layer capacitors are described as some preferred embodiments of the present invention, the present invention can also be applied to other electrical storage devices, such as lithium ion batteries and lithium ion capacitors.

While preferred embodiments of the invention have been described above, it is to be understood that variations and modifications will be apparent to those skilled in the art without departing from the scope and spirit of the invention. The scope of the invention, therefore, is to be determined solely by the following claims.

What is claimed is:

1. An electrical storage device comprising:
a package having a body and a lid that together define a closed space; and
an electrical storage element disposed in the closed space and comprising a plurality of element terminals, a first main surface and a second main surface that opposes the first main surface,
wherein the body of the package comprises:
a metallic portion having a plurality of lead-out terminals electrically coupled to the plurality of element terminals, respectively,
a resin portion having at least one projection extending into the closed space,
a bottom wall that faces the first main surface of the electrical storage element, and
wherein the lid of the package comprises:
a main wall that faces the second main surface of the electrical storage element, and
at least one side wall along an edge portion of the main wall, and the at least one projection further extends to the side wall.

2. The electrical storage device according to claim 1, wherein electrolytic solution is loaded in the closed space.

3. The electrical storage device according to claim 1, wherein the at least one projection narrows the closed space.

4. The electrical storage device according to claim 1, wherein the lead-out terminals extend through the body in a direction of a thickness of the body.

5. The electrical storage device according to claim 1, wherein the resin portion includes an insulating portion that electrically insulates the plurality of lead-out terminals from each other.

6. The electrical storage device according to claim 1, wherein the at least one projection extends to the main wall of the lid.

7. The electrical storage device according to claim 6, wherein the lid of the package further comprises at least one side wall along an edge portion of the main wall.

8. The electrical storage device according to claim 7, wherein the at least one projection further extends to the side wall.

9. The electrical storage device according to claim 1, wherein the resin portion is manufactured from the group consisting of polyether ether ketone, polyphenylene sulfide, and a liquid-crystalline polymer.

10. The electrical storage device according to claim 1, wherein a surface of each of the lead-out terminals comprises fine depressions with a diameter of between approximately 20 nm and approximately 60 nm.

11. The electrical storage device according to claim 1, wherein the electrical storage element further comprises a pair of layers of active material and a porous separator disposed between the pair of layers of active material.

12. The electrical storage device according to claim 11, wherein a portion of the porous separator is disposed adjacent to the body of the package.

13. An electrical storage device, comprising:
a package having a body and a lid that together define a closed space; and
an electrical storage element disposed in the closed space and comprising a plurality of element terminals,
wherein the body of the package comprises:
a metallic portion having a plurality of lead-out terminals electrically coupled to the plurality of element terminals, respectively, and
a resin portion comprising a pair of projections that each extend into the closed space,
wherein the electrical storage element is sandwiched between the pair of projections with one of the pair of projections adjacent to a first end portion of the storage element and the other of the pair of projections adjacent to a second end portion of the storage element.

14. The electrical storage device according to claim 13, wherein two of the element terminals are disposed at the first and second end portions of the electrical storage element, respectively, and two of the lead-out terminals are disposed between the two projections.

15. An electrical storage device, comprising:
a package having a body and a lid that together define a closed space; and
an electrical storage element disposed in the closed space and comprising a plurality of element terminals,
wherein the body of the package comprises:
a metallic portion having a plurality of lead-out terminals electrically coupled to the plurality of element terminals, respectively,
a resin portion having at least one projection extending into the closed space, and
a bottom wall that includes a section where the metallic portion and the resin portion are layered.

16. The electrical storage device according to claim 15, wherein the section where the metallic portion and the resin portion are layered is at least half by area of the bottom wall of the body.

* * * * *